United States Patent
Markarian et al.

(10) Patent No.: US 10,576,936 B2
(45) Date of Patent: Mar. 3, 2020

(54) HOLDER FOR MOTOR VEHICLE WIPER ARMS

(71) Applicants: James M. Markarian, New York, NY (US); Pasquale Musacchio, Morris Plains, NJ (US)

(72) Inventors: James M. Markarian, New York, NY (US); Pasquale Musacchio, Morris Plains, NJ (US)

(*) Notice: Subject to any disclaimer, the term of this patent is extended or adjusted under 35 U.S.C. 154(b) by 272 days.

(21) Appl. No.: 14/961,860

(22) Filed: Dec. 7, 2015

(65) Prior Publication Data
US 2017/0158171 A1    Jun. 8, 2017

(51) Int. Cl.
*F16B 7/10*     (2006.01)
*B60S 1/04*    (2006.01)
*A47F 5/00*    (2006.01)

(52) U.S. Cl.
CPC .............. *B60S 1/0455* (2013.01); *A47F 5/00* (2013.01); *F16B 7/10* (2013.01); *F16B 7/105* (2013.01)

(58) Field of Classification Search
CPC ........... B60S 1/0455; F16B 7/105; A47F 5/00
USPC ..... 15/257.01; 248/354.1, 125.8, 188.5, 326, 248/333, 354.3; 403/109.1
See application file for complete search history.

(56) References Cited

U.S. PATENT DOCUMENTS

| | | | | |
|---|---|---|---|---|
| 6,503,019 B1 * | 1/2003 | Wang | ................... | B62J 99/00 224/501 |
| 7,293,934 B1 * | 11/2007 | Huang | ................... | F16B 7/105 403/109.1 |
| 8,496,217 B2 * | 7/2013 | Cerezo Lotina | ........ | E04G 21/26 248/351 |
| 2005/0161571 A1 * | 7/2005 | Wood | ................... | E04G 25/061 248/354.3 |
| 2009/0184299 A1 * | 7/2009 | Pasto | ................... | B66F 3/08 254/134 |
| 2012/0068036 A1 * | 3/2012 | Cerezo Lotina | ........ | E04G 21/26 248/354.1 |

FOREIGN PATENT DOCUMENTS

WO    WO 9937511 A1 *   7/1999    ............ B60S 1/0477

* cited by examiner

*Primary Examiner* — Monica S Carter
*Assistant Examiner* — Katina N. Henson
(74) *Attorney, Agent, or Firm* — Law Office of Pasquale Musacchio LLC

(57) ABSTRACT

A wiper arm holder for supporting first and second wiper arm elements located in extended position relative to a motor vehicle windshield. The holder includes a shaft section having a first end loop for attaching the shaft section to the first wiper arm element. The holder also includes a receiver section having a second end loop for attaching the receiver section to the second wiper arm element. The receiver section receives the shaft section and the shaft section is moveable relative to the receiver section. In use, the shaft section is moved to a desired position that changes a distance between the first and second wiper arm elements to place the first and second wiper arms in tension. Further, the holder includes a locking mechanism for locking the shaft section in the desired position. In an embodiment, the holder includes a rotatable support arm that abuts against the windshield to support the holder.

17 Claims, 5 Drawing Sheets

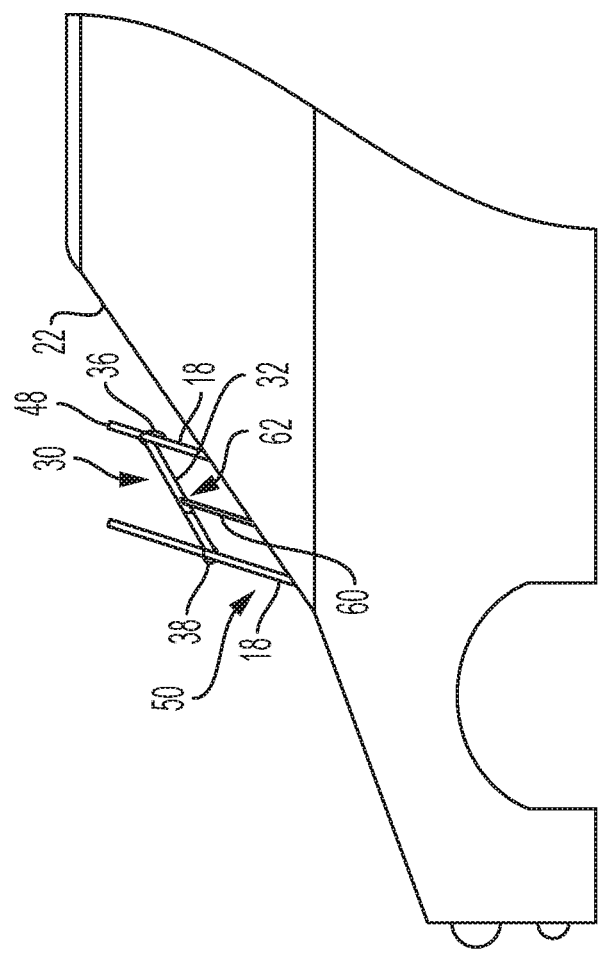

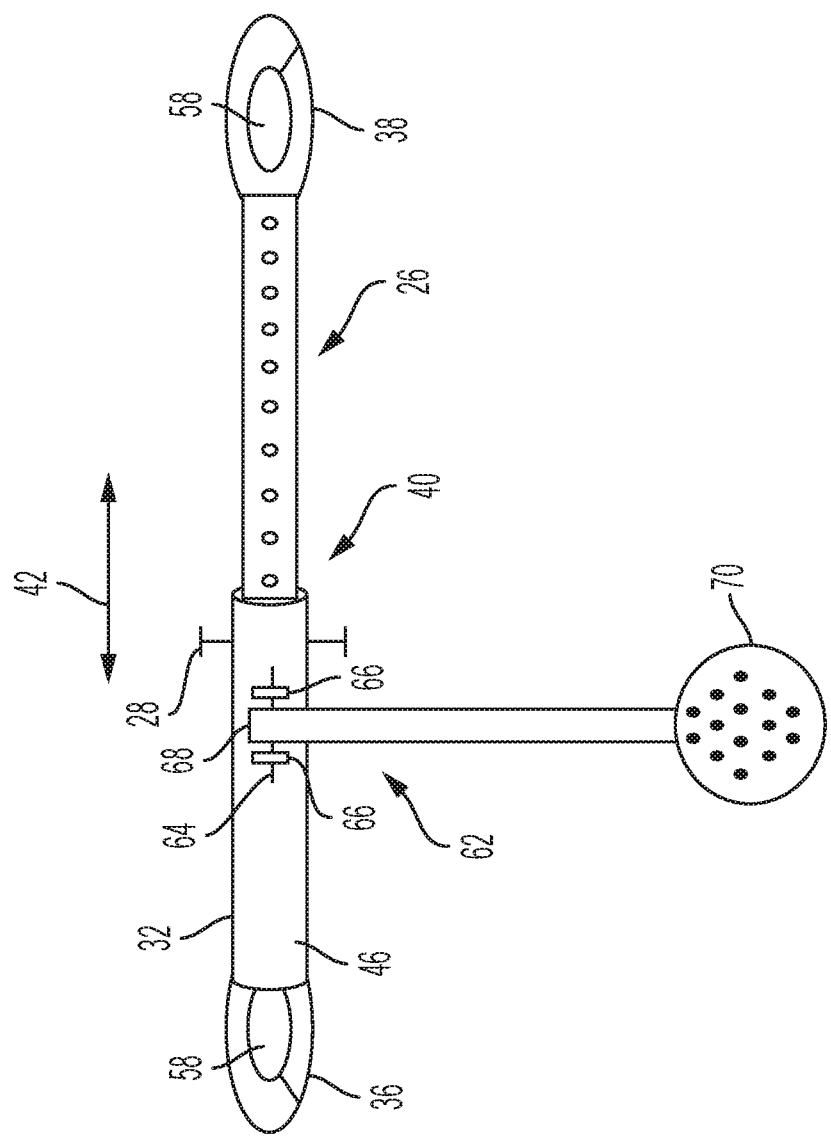

HOLDER FOR MOTOR VEHICLE WIPER ARMS

FIELD OF THE INVENTION

This invention relates to windshield wiper systems for a motor vehicle, and more particularly, to a holder for motor vehicle wiper arms that places the wiper arms under tension in order to hold the wiper arms in an extended position away from a motor vehicle windshield.

BACKGROUND OF THE INVENTION

Motor vehicles typically include a windshield wiper system having wiper arm assemblies each including a wiper arm and a wiper blade. In use, each wiper blade is located in a blade contact position wherein the wiper blade contacts a surface of the windshield. The wiper arm assemblies articulate back and forth across the windshield of a vehicle so that the wiper blades wipe away or clean water, snow, debris and other undesirable items from the windshield to provide the operator and other occupants with a clear sight path through the windshield.

Referring to FIG. 1, an exemplary wiper atm assembly 10 including a wiper arm 12 and associated wiper blade 14 is shown. The wiper arm 12 includes a base arm section 15 that is attached to a rotatable shaft 16 of a wiper motor. The wiper arm 12 also includes a moveable arm section 18 that is attached to the base section 15 by a hinge or pivot joint 20. The pivot joint 20 enables rotation of the moveable section 18 and wiper blade 14 away from the contact position to an extended position wherein the moveable section 18 and the wiper blade 14 are spaced apart from a windshield 22. In cold and snowy conditions, for example, many vehicle operators position at least one wiper blade 14 in the extended position when the motor vehicle is not being operated (i.e. parked) to prevent the wiper blade 14 from being frozen in place when snow, ice or other debris accumulates on the windshield 22. In addition, placement of the wiper blade 14 in the extended position enables easy removal of snow, ice or debris since the wiper blade 14 is out of the way. However, the moveable section 18 may move or snap back in a first direction 24 toward the windshield 22 such that the wiper blade 14 moves from the extended position to the contact position and impacts the windshield 22 with sufficient force so as to damage the windshield 22 and/or the wiper blade 14.

SUMMARY OF INVENTION

A wiper arm holder for supporting first and second wiper arm elements located in extended position relative to a motor vehicle windshield is disclosed. The holder includes a shaft section having a first end loop for attaching the shaft section to the first wiper arm element. The holder also includes a receiver section having a second end loop for attaching the receiver section to the second wiper arm element. The receiver section receives the shaft section and the shaft section is moveable relative to the receiver section. In use, the shaft section is moved to a desired position that changes a distance between the first and second wiper arm elements to place the first and second wiper arms in tension. Further, the holder includes a locking mechanism for locking the shaft section in the desired position. In an embodiment, the holder includes a rotatable support arm that abuts against the windshield to support the holder.

In addition, a method for supporting first and second wiper arm elements located in extended position relative to a motor vehicle windshield is disclosed. The method includes providing a shaft section having a first end loop for attaching the shaft section to the first wiper arm element. The method also includes providing a receiver section having a second end loop for attaching the receiver section to the second wiper arm element wherein the receiver section is moveable relative to the receiver section. Further, the method includes tensioning the first and second wiper arms by moving the shaft section to a desired position that changes a distance between the first and second wiper arm elements to place the first and second wiper arms in tension. The method also includes locking the shaft section in the desired position.

Those skilled in the art may apply the respective features of the present invention jointly or severally in any combination or sub-combination.

BRIEF DESCRIPTION OF DRAWINGS

The teachings of the present disclosure can be readily understood by considering the following detailed description in conjunction with the accompanying drawings, in which:

FIG. 5 is a partial side view of a motor vehicle which depicts an additional alternate embodiment of the holder.

FIG. 6 is another view of the holder and support element shown in FIG. 5.

To facilitate understanding, identical reference numerals have been used, where possible, to designate identical elements that are common to the figures.

DETAILED DESCRIPTION

Figure 1:
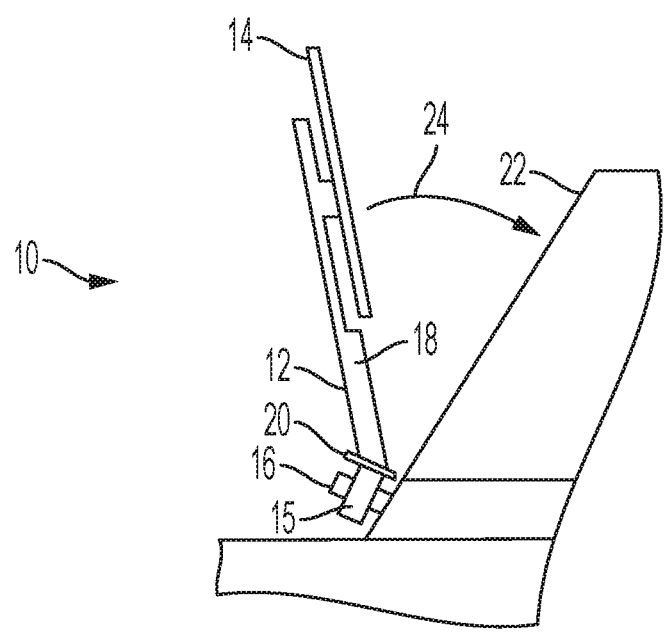
FIG. 1 is a view of an exemplary wiper arm assembly including a wiper arm and associated wiper blade.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
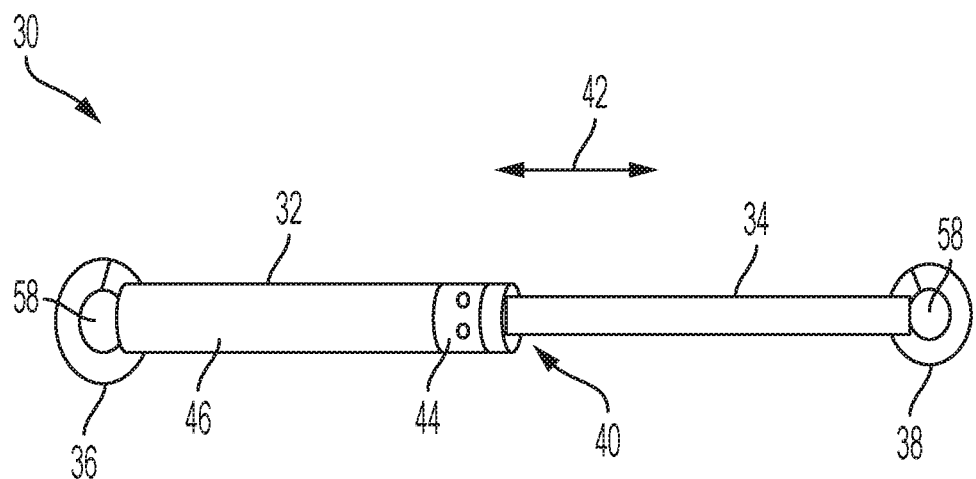
FIG. 2 is a view of a wiper blade holder in accordance with an embodiment of the invention.

Referring to FIG. 2, a wiper arm holder 30 in accordance with an embodiment of the invention is shown. The holder 30 includes a receiver section 32 and a moveable shaft section 34 having first 36 and second 38 end loops, respectively. The receiver section 32 includes an interior hollow 40 for receiving the shaft section 34. The shaft section 34 is moveable relative to the receiver section 32 to form a telescoping arrangement wherein the shaft section 34 moves in and out of the receiver section 32 in a longitudinal direction 42 thus moving the first 36 and second 38 end loops closer and further away, respectively, from each other. The receiver section 32 also includes a locking mechanism 44 for locking the shaft section 34 in place once the shaft section 34 is located in a desired position. By way of example, the locking mechanism 44 may be a locking collar, clutch lock, cam lock, snap collar, twist lock compression lock arrangement or other known locking mechanism.

Figure 3:
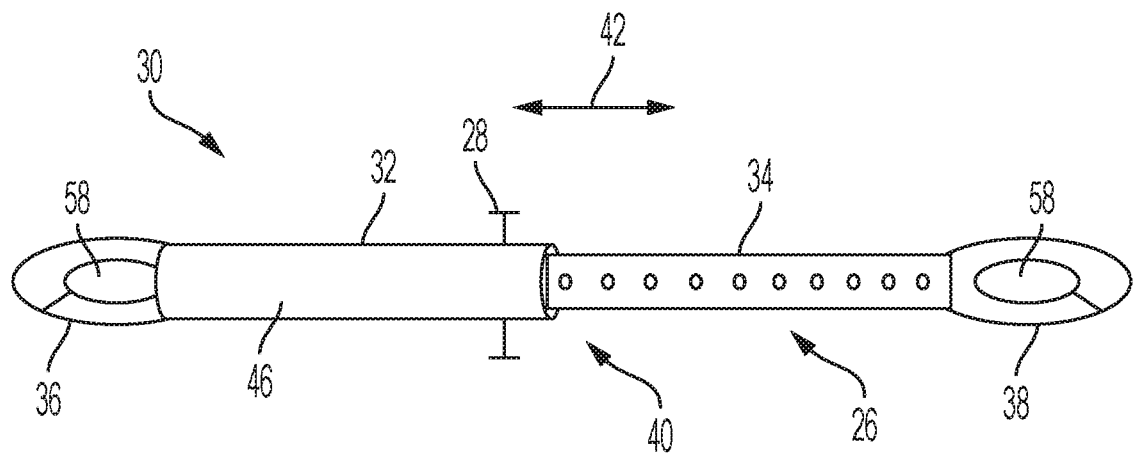
FIG. 3 depicts an alternate embodiment of the holder wherein a receiver section includes a pin element and a shaft section includes a hole arrangement for receiving the pin element to lock the shaft section in a desired position.

Referring to FIG. 3, an alternate embodiment for the holder 30 is shown. In this embodiment, the shaft section 34 includes a plurality of holes 26 for receiving a pin element 28 that extends through the receiver section 32. In use, the shaft section 34 is moved to a desired position relative to the receiver section 32. The pin element 28 is then positioned through a selected hole 26 corresponding to the desired position thereby locking the shaft section 34 in the desired position.

In yet another embodiment, the receiver section 32 may include a channel section, formed on an exterior surface 46 of the receiver section 32, which receives the shaft section 34. Further, the receiver section 32 may include one or more aligned guide elements, such as wire guides formed on the exterior surface 46, which receive the shaft section 34.

Figure 4:
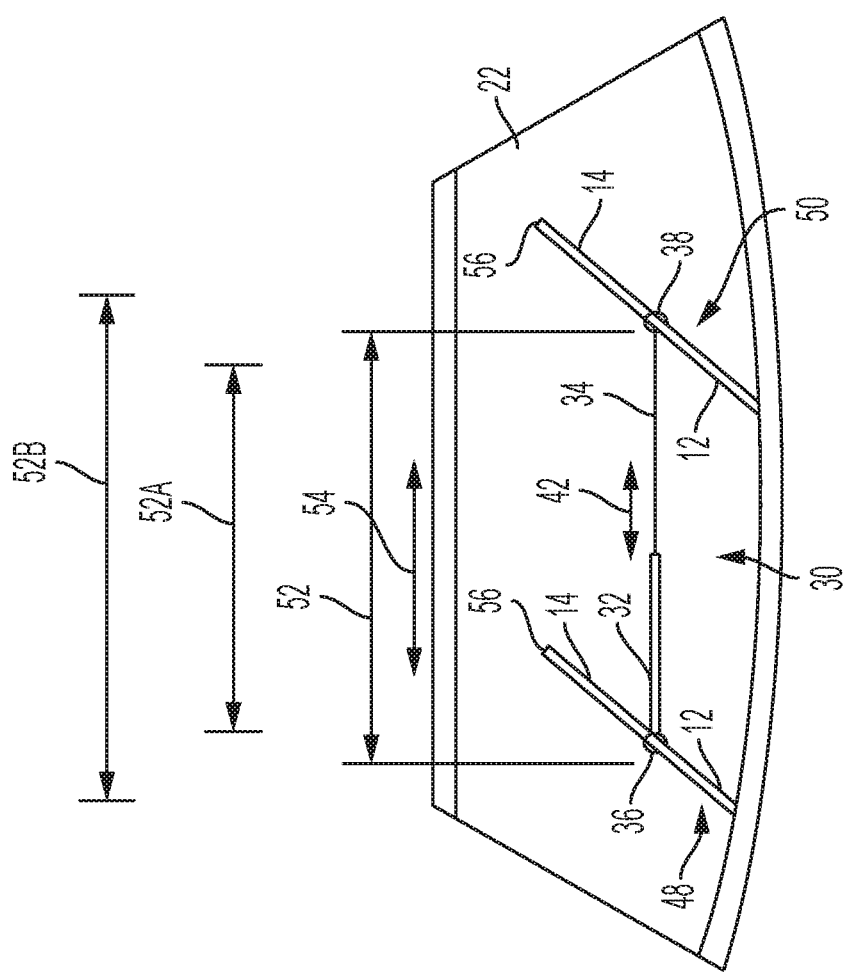
FIG. 4 is a front view of a holder attached to first and second wiper arm assemblies located in an extended position relative to a windshield of a motor vehicle.

Referring to FIG. 4, a front view of a holder 30 attached to first 48 and second 50 wiper arm assemblies located in an extended position relative to windshield 22 of a motor vehicle is shown. Referring to FIG. 4 in conjunction with FIGS. 2 and 3, the first 36 and second 38 end loops are removeably attached to the first 48 and second 50 wiper arm assemblies, respectively, of a motor vehicle. In particular, the first 36 and second 38 end loops each include an aperture 58 for receiving and removeably attaching a portion of a wiper arm assembly 48, 50 such as an associated wiper arm 12 or wiper blade 14 or a combination thereof. In an embodiment, the first 36 and second 38 end loops are fabricated from a resilient material, such as rubber or an elastomeric material, which stretches and conforms to the shape of a portion of an associated wiper arm assembly 48,50 such as an associated wiper arm 14 or wiper blade 14. For example, the first 36 and second 38 end loops are removeably attached to an associated wiper assembly 48, 50 by inserting an end 56 of a wiper arm 14 into an aperture 58 that is sized smaller than the wiper arm 14. Alternatively, the first 36 and second 38 end loops may be fabricated from a molded material, such as plastic, having an aperture 58 that corresponds to a shape of a portion of the first 48 and second 50 wiper arm assemblies. In another embodiment, the first 36 and second 38 end loops may include a hook and loop fastener (i.e. a Velcro® fastener), a strap, clamp device, clasp device or other known attachment method and combinations thereof.

As previously described, the moveable section. 18 may move or snap back in a first direction 24 toward the windshield 22 such that the wiper blade 14 moves from the extended position to the contact position and impacts the windshield 22 with sufficient force so as to damage the windshield 22 and/or the wiper blade 14. Movement to the contact position occurs when the first 48 and second 50 wiper arm assemblies are separated by a first distance 52 as shown in FIG. 4. In accordance with aspects of the invention, the first distance 52 between the first 48 and second 50 wiper arm assemblies may be decreased to a second distance 52A by moving the shaft section 34 into the receiver section 32 in the longitudinal direction 42. Alternatively, the first distance 52 between the first 48 and second 50 wiper arm assemblies may be increased to a third distance 52B by moving the shaft section 34 out of the receiver section 32 in the longitudinal direction 42. In accordance with aspects of the invention, decreasing or increasing the first distance 52 between the first 48 and second 50 wiper arm assemblies to either the first 52A or second 52B distances, respectively, places the wiper arm assemblies 48, 50 under tension in a tension direction 54 substantially transverse to the first direction 24 (see FIG. 1). In particular, placing the first 48 and second 50 wiper arm assemblies under tension holds the first 48 and second 50 wiper arm assemblies in the extended position. This substantially reduces the likelihood that either or both wiper arm assemblies 48, 50 move or snap back toward the windshield 22 thus causing damage of the windshield 22 or wiper arm 14.

FIG. 5 is a partial side view of a motor vehicle which depicts the first 48 and second 50 wiper arm assemblies in the extended position and an alternate embodiment of the holder 30. In this embodiment, the holder 30 includes a support element 60 that is attached to the receiver section 32, for example, of the holder 30 by a hinge element 62. When the wiper blade 14 is in the extended position, a vehicle operator may rotate the support element 60 about the hinge element 62 toward the windshield 22 until the support element 60 contacts or abuts against the windshield 22 in a support position as shown in FIG. 5. In this position, the support element 60 supports the holder 30 and thus the moveable section 18 of the first 48 and second 50 wiper arm assemblies so as to inhibit movement of either or both wiper arm assemblies 48, 50 toward the windshield 22, thus reducing the likelihood of damage to the wiper blade 14 or windshield 22.

FIG. 6 is another view of the holder 30 and support element 60 shown in FIG. 5. As previously described, the receiver section 32 includes the hinge element 62. The hinge element 62 includes a pivot pin 64 that extends through pin supports 66 located on the receiver section 32. The pivot pin 64 also extends through an end 68 of the support element 60 located between the pin supports 66. The support element 60 is rotatable about the pivot pin 64 thus enabling rotation of the support element 60 toward the windshield 22 and away from the windshield 22. The hinge element 62 may be located in any location on the receiver section 32 such as in a central portion of the receiver section 32 or adjacent the end loops 36, 38, thereby locating the support element 32 in close proximity to a wiper arm assembly 48, 50. The support element 60 may also include a rotatable support pad 70 that is rotatable relative to the support element 60 such that the support pad 70 rests against the windshield 22. The support pad 70 may be rotated and adjusted to align with an orientation of the windshield 22 so that substantially all portions of the support pad 70 contact the windshield 22. Further, a portion of the support pad 70 may be fabricated from a material that increases friction between the support pad 70 and the windshield 22, such as a rubberized material, so as to maintain a position of the support pad 70 relative to the windshield 22 to enhance stability of the support element 60 when the support element 60 is in the support position shown in FIG. 5. In addition, more than one support element 60 may be used to support the wiper arm assemblies 48, 50.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A wiper arm holder that supports first and second wiper arm elements separated by a first distance, wherein the first and second wiper arm elements are located in an extended position relative to a windshield, comprising:
   a shaft section having a first end loop that attaches the shaft section to the first wiper arm element;
   a receiver section having a second end loop that attaches the receiver section to the second wiper arm element, wherein the receiver section receives the shaft section and the shaft and receiver sections form a telescoping arrangement wherein the shaft section is manually moveable relative to the receiver section to a desired position that changes the first distance to place the first and second wiper arms in tension and wherein the shaft section is manually detachable from the receiver section to form separate shaft and receiver sections; and
   a locking mechanism that locks the shaft section in the desired position.

2. The holder according to claim 1, wherein tension is generated by decreasing the first distance.

3. The holder according to claim 1, wherein tension is generated by increasing the first distance.

4. The holder according to claim 1, wherein the shaft section includes a plurality of holes and the receiver section includes a pin element located in one of the holes to lock the shaft section in the desired position.

5. The holder according to claim 1, further including a support element attached to the holder wherein the support element contacts the windshield to support the holder.

6. The holder according to claim 1, wherein the support element includes a support pad that contacts the windshield to support the holder.

7. A method of supporting first and second wiper arm elements, comprising:
   moving the first and second wiper arm elements to an extended position relative to the windshield, wherein the first and second wiper arm elements are separated by a first distance when in the extended position;
   providing a shaft section having a first end loop that attaches the shaft section to the first wiper arm element;
   providing a receiver section having a second end loop that attaches the receiver section to the second wiper arm element wherein the shaft section is received by the receiver section to form a telescopic arrangement wherein the shaft and receiver sections are manually moveable relative to each other and wherein the shaft section is manually detachable from the receiver section to form separate shaft and receiver sections;
   tensioning the first and second wiper arms by moving the shaft section to a desired position that changes the first distance; and
   locking the shaft section in the desired position.

8. The method according to claim 7, wherein tension is generated by decreasing the first distance.

9. The method according to claim 7, wherein tension is generated by increasing the first distance.

10. The method according to claim 7, further including positioning a pin element in a hole located in the shaft section to lock the shaft section in the desired position.

11. The method according to claim 7, further including providing a support element attached to the holder wherein the support element contacts the windshield to support the holder.

12. The method according to claim 7, wherein the support element includes a support pad that contacts the windshield to support the holder.

13. A wiper arm holder that supports first and second wiper arm elements separated by a first distance, wherein the first and second wiper arm elements are located in an extended position relative to a windshield, comprising:
   a shaft section having a first end loop that attaches the shaft section to the first wiper arm element;
   a receiver section having a second end loop that attaches the receiver section to the second wiper arm element, wherein the receiver section receives the shaft section and the shaft and receiver sections form a telescoping arrangement wherein the shaft section is manually moveable relative to the receiver section to a desired position that changes the first distance to place the first and second wiper arms in tension and wherein the shaft section is manually detachable from the receiver section to form separate shaft and receiver sections; and
   a support element rotatably attached to the receiver section by a hinge element, wherein the support element rotates relative to the receiver section and toward the windshield and contacts the windshield to support the receiver section; and
   a locking mechanism that locks the shaft section in the desired position.

14. The holder according to claim 13, wherein tension is generated by decreasing the first distance.

15. The holder according to claim 13, wherein tension is generated by increasing the first distance.

16. The holder according to claim 13, wherein the shaft section includes a plurality of holes and the receiver section includes a pin element located in one of the holes to lock the shaft section in the desired position.

17. The holder according to claim 13, wherein the support element includes a support pad that contacts the windshield to support the holder.

* * * * *